United States Patent
Yeon et al.

(10) Patent No.: US 11,721,053 B2
(45) Date of Patent: Aug. 8, 2023

(54) COOKING DEVICE AND CONTROL METHOD THEREFOR

(71) Applicant: SAMSUNG ELECTRONICS CO., LTD., Suwon-si (KR)

(72) Inventors: Jieun Yeon, Suwon-si (KR); Kyungjin Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 17/275,333

(22) PCT Filed: Sep. 4, 2019

(86) PCT No.: PCT/KR2019/011393
§ 371 (c)(1),
(2) Date: Mar. 11, 2021

(87) PCT Pub. No.: WO2020/055029
PCT Pub. Date: Mar. 19, 2020

(65) Prior Publication Data
US 2022/0051458 A1    Feb. 17, 2022

(30) Foreign Application Priority Data

Sep. 13, 2018  (KR) .................. 10-2018-0109814

(51) Int. Cl.
*G06F 3/0484*    (2022.01)
*G06T 11/60*    (2006.01)
(Continued)

(52) U.S. Cl.
CPC .......... *G06T 11/60* (2013.01); *G06F 3/04842* (2013.01); *H04N 23/60* (2023.01)

(58) Field of Classification Search
CPC ...... G06T 11/60; G06F 3/04842; H04N 5/232
See application file for complete search history.

(56) References Cited

U.S. PATENT DOCUMENTS

| 9,012,814 B2 * | 4/2015 | Park ........................ F24C 7/087 |
| | | 219/490 |
| 10,398,260 B2 * | 9/2019 | Park .................... A47J 37/0664 |

(Continued)

FOREIGN PATENT DOCUMENTS

| JP | 2006-329455 | 12/2006 |
| JP | 2016-80268 | 5/2016 |

(Continued)

OTHER PUBLICATIONS

International Search Report and Written Opinion of the International Searching Authority dated Feb. 6, 2020 from International Application No. PCT/KR2019/011393, 13 pages (Continued)

*Primary Examiner* — Anil K Bhargava
(74) *Attorney, Agent, or Firm* — Staas & Halsey LLP

(57) ABSTRACT

A cooking device is disclosed. The disclosed cooking device comprises: a driving device for cooking food to be cooked; an input device for receiving, from a user, a control command for a cooking operation of the cooking device; an imaging device for photographing the food to be cooked; and a processor for controlling the driving device such that a cooking operation corresponding to the inputted control command is performed, wherein the processor controls the imaging device such that the food to be cooked is photographed, analyzes each of a plurality of frames of the (Continued)

captured image so as to generate an edited image, and generates cooking content by using the edited image and the inputted control command.

13 Claims, 11 Drawing Sheets

(51) Int. Cl.
*G06F 3/04842* (2022.01)
*H04N 23/60* (2023.01)

(56) References Cited

U.S. PATENT DOCUMENTS

| | | | |
|---|---|---|---|
| 10,612,789 B2 | 4/2020 | Park et al. | |
| 2015/0281710 A1* | 10/2015 | Sievert | H04L 65/762 375/240.02 |
| 2017/0074522 A1* | 3/2017 | Cheng | H05B 6/6441 |
| 2017/0150842 A1* | 6/2017 | Young | A47J 27/10 |
| 2017/0195542 A1* | 7/2017 | Thomas | H04N 5/907 |
| 2017/0280515 A1* | 9/2017 | Imai | H05B 6/6455 |
| 2018/0324908 A1* | 11/2018 | Denker | G01K 1/026 |
| 2021/0043108 A1* | 2/2021 | Baumback | G06F 40/284 |

FOREIGN PATENT DOCUMENTS

| | | |
|---|---|---|
| JP | 2018-77562 | 5/2018 |
| KR | 10-2006-0088747 | 8/2006 |
| KR | 10-2008-0066161 | 7/2008 |
| KR | 10-1457087 | 10/2014 |
| KR | 10-1559980 | 10/2015 |
| KR | 10-2016-0023006 | 3/2016 |
| KR | 10-2017-0004523 | 1/2017 |
| KR | 10-2017-0106143 | 9/2017 |
| KR | 10-2018-0015926 | 2/2018 |
| KR | 20180015926 * | 2/2018 |

OTHER PUBLICATIONS

D. Pierce, "The June Oven"; retrieved from: https://www.wired.com/2015/06/june-oven/; Jun. 2015; 3 pages total.

Extended European Search Report dated Nov. 24, 2021 from European Application No. 19859665.2.

* cited by examiner (a) (b)

FIG. 5

| No | FUNCTION | EDITING METHOD |
|---|---|---|
| 1 | FERMENTATION | A |
| 2 | DRYING | B |
| 3 | ROASTING A | C |
| 4 | ROASTING B | D |
| 5 | ROASTING C | E |
| 6 | DEFROSTING | F |

COOKING DEVICE AND CONTROL METHOD THEREFOR

CROSS-REFERENCE TO RELATED APPLICATIONS

This application is a U.S. National Stage Application, which claims the benefit under 35 U.S.C. § 371 of PCT International Patent Application No. PCT/KR2019/011393, filed Sep. 4, 2019 which claims the foreign priority benefit under 35 U.S.C. § 119 of Korean Patent Application No. 10-2018-0109814, filed Sep. 13, 2018, the contents of which are incorporated herein by reference.

TECHNICAL FIELD

This disclosure relates to a cooking device and a control method thereof and, more specifically, to a cooking device which generates a cooking content by using an image photographing by a cooking object during a cooking operation and an input control command and a control method thereof.

BACKGROUND ART

A cooking device is a device configured to cook food. For example, a cooking device 100 may correspond to a microwave, an oven, induction, or the like.

Recently, an imaging device is provided on a cooking device to generate an image photographing a food to be cooked. However, the photographed image does not include information on the control command for the cooking process, and a user should remember a control command for the cooking process.

DISCLOSURE

Technical Problem

An object of the disclosure is to provide a cooking device for generating cooking content using an image photographing a food to be cooked and an inputted control command during a cooking operation and a control method thereof.

Technical Solution

According to an embodiment, a cooking device includes a driving device configured to cook food to be cooked, an input device configured to receive, from a user, a control command for a cooking operation of the cooking device, an imaging device configured to photograph the food to be cooked, and a processor configured to control the driving device such that a cooking operation corresponding to the inputted control command is performed, and the processor may control the imaging device such that the food to be cooked is photographed, analyze each of a plurality of frames of the photographed image to generate an edited image, and generate cooking content by using the edited image and the inputted control command.

According to an embodiment, a control method of a cooking device may include receiving, from a user, a control command for a cooking operation of the cooking device; performing a cooking operation corresponding to the input control command using a driving device; photographing a food to be cooked; analyzing each of a plurality of frames of the photographed image to generate an edited image; and generating cooking content by using the edited image and the inputted control command.

DESCRIPTION OF DRAWINGS

FIG. 5 is a diagram illustrating a method of generating an edited image of a cooking device by functions according to an embodiment;

BEST MODE FOR CARRYING OUT THE INVENTION

Figure 1:
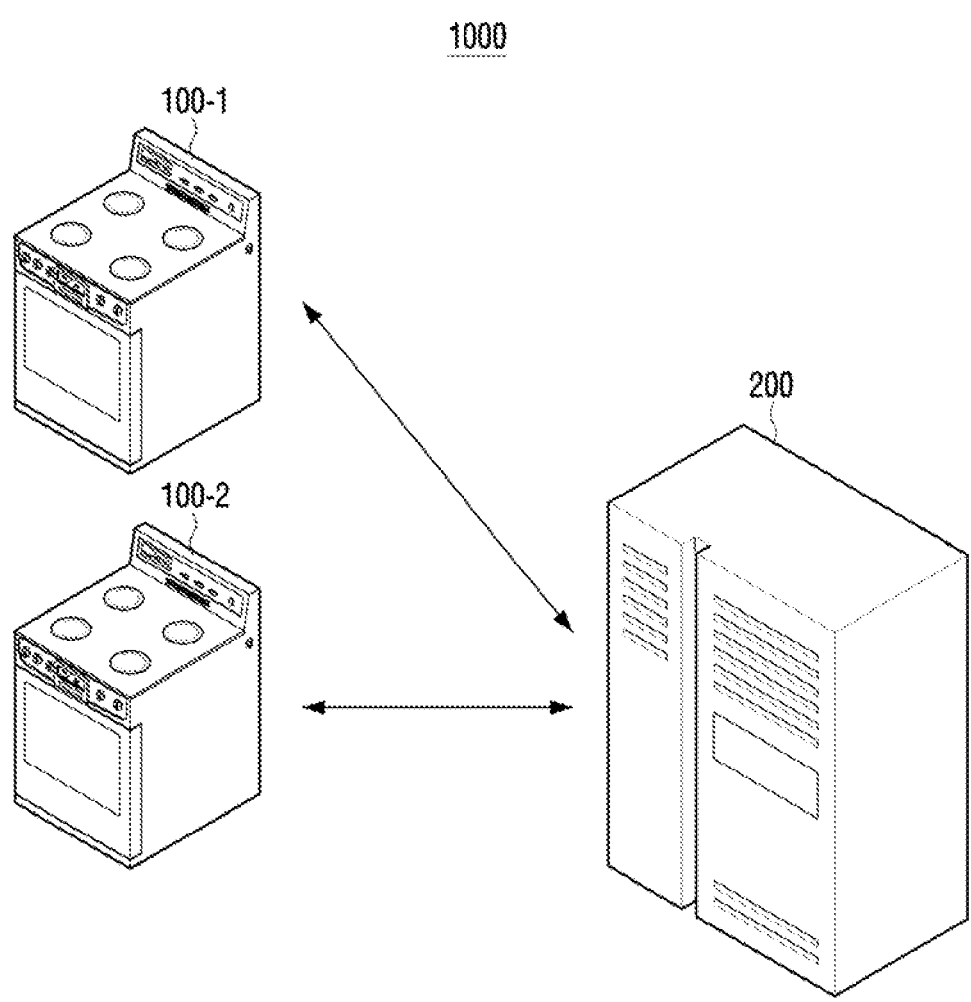
FIG. 1 is a diagram illustrating a cooking content use system according to an embodiment.

After terms used in the present specification are briefly described, the disclosure will be described in detail.

The terms used in the present disclosure and the claims are general terms identified in consideration of the functions of the various embodiments of the disclosure. However, these terms may vary depending on intention, technical interpretation, emergence of new technologies, and the like, of those skilled in the related art. Unless a specific definition of a term is provided, the term may be understood based on the overall content and technological understanding of those skilled in the related art.

Since the disclosure may be variously modified and have several embodiments, specific non-limiting example embodiments of the disclosure will be illustrated in the drawings and be described in detail in the detailed description. However, it is to be understood that the disclosure is not limited to specific non-limiting example embodiments, but includes all modifications, equivalents, and substitutions without departing from the scope and spirit of the disclosure. A detailed description of known configurations related to the disclosure may be omitted so as to not obscure the gist of the disclosure.

Terms such as "first," "second," and the like, may be used to describe various components, but the components should not be limited by the terms. The terms are used to distinguish a component from another component.

A singular expression includes a plural expression, unless otherwise specified. It is to be understood that the terms such as "comprise," "comprising," "including," and the like, are used herein to designate a presence of a characteristic, number, step, operation, element, component, or a combination thereof, and do not preclude a presence or a possibility of adding one or more of other characteristics, numbers, steps, operations, elements, components or a combination thereof.

Hereinafter, non-limiting embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted.

The disclosure will be described in greater detail with reference to drawings.

FIG. 1 is a diagram illustrating a cooking content use system according to an embodiment.

Referring to FIG. 1, a system 1000 using a cooking content may include a plurality of cooking devices 100-1 and 100-2 and an external device 200.

The plurality of cooking devices 100-1 and 100-2 are devices configured to cook foods. For example, the plurality of cooking devices 100-1 and 100-2 may correspond to a microwave, an oven, induction, and the like.

The plurality of cooking devices 100-1 and 100-2 may perform a plurality of functions for cooking foods. The plurality of functions may correspond to roasting, drying, defrosting, fermentation, an air-frying and a steam function, or the like, and is not intended to be the above-described example.

A first cooking device 100-1 may receive a control command corresponding to a cooking operation from the user to perform the cooking operation. The first cooking device 100-1 may receive a selection of one function among a plurality of functions, and may receive a command for setting options such as temperature or cooking time for the function, or the like. For example, a user may select a roasting function and the first cooking device 100-1 may receive a setting option to perform a cooking for ten minutes at a temperature of 180 degrees.

The first cooking device 100-1 may photograph a food to be cooked while performing a cooking operation. The first cooking device 100-1 may photograph the food to be cooked during the cooking operation by using an imaging device provided inside or outside of the first cooking device 100-1 while performing the cooking operation according to the control command received from the user.

The first cooking device 100-1 may generate an edited image by editing the photographed image, and may generate a cooking content by using the generated edited image, the control command inputted from the user, and the metadata related to the cooking operation. If the generated cooking content is used, the user may identify the edited image for the cooking process included in the cooking content, and if the user wishes, the first cooking device 100-1 may perform the same cooking process using the control command included in the cooking content.

The first cooking device 100-1 may transmit and receive a cooking content generated through communication with the external device 200 to and from the external device 200.

The external device 200 may store a cooking content received from the first cooking device 100-1. The external device 200 may be a server, a smartphone, a personal computer (PC), or the like, and may not be limited to the above example.

The external device 200, based on receiving a request for a specific cooking content among the stored cooking contents from a second cooking device 100-2, may transmit the requested cooking content to the second cooking device 100-2.

The second cooking device 100-2 may play an edited image included in the received cooking content to the user, and based on receiving an execution command for the cooking operation corresponding to the cooking content being inputted from the user, may extract a control command included in the cooking content and perform the same cooking operation.

As described above, the cooking device may generate a cooking content based on the image photographing the cooking process, input control command and the meta data related to the cooking operation. The external device may receive and store the generated cooking content and transmit again the stored cooking content to the cooking device requiring the stored cooking content. The cooking device may perform cooking operations corresponding to the cooking content by using the cooking content received without the user's specific control command for the cooking operation.

The general user may easily perform the cooking operation by using the cooking content generated by a cooking expert, and may secure data that is a basis for a study on a food recipe when a plurality of cooking content is stored in the external device. The user may only extract the edited image included in the cooking content and use the image for another usage.

For example, a cooking expert may generate a cooking content associated with custard cream making and upload the same to an external server. A general user may receive and play an edited image for a custard cream cooking process included in a cooking content through a cooking device, and may input a command to a cooking device to perform the same cooking process when the user desires to perform the cooking process of custard cream making. The cooking device may perform the same cooking operation by using the control command included in the cooking content.

According to still another example, the cooking expert may control a cooking device to perform a plurality of roasting functions, which have a different setting temperature and a setting time, for a recipe development of cooking A. The cooking device may generate a plurality of cooking contents for each of the plurality of cooking operations having different setting options and transmit the same to the external device. The cooking expert may analyze a plurality of cooking content to perform a recipe development.

According to another example, family members may together complete cooking by using the cooking device, extract an edited image from the cooking content for the completed cooking and may store the edited image separately. An edited image for a completed cooking may be transmitted to a refrigerator capable of communicating with an external device, so that the refrigerator may play an edited image through a display provided in the refrigerator.

Referring to FIG. 1, the cooking content generated by the first cooking device is transmitted to the external device, and the second cooking device receives cooking content generated by the external device from the external device, but in the implementation, the first cooking device and the second cooking device may be implemented to perform direct communication to transmit and receive the cooking content.

In illustrating FIG. 1, the cooking content utilization system includes two cooking devices. However, in the implementation, one or more cooking devices may be implemented in a manner including one or more cooking devices.

Figure 2:
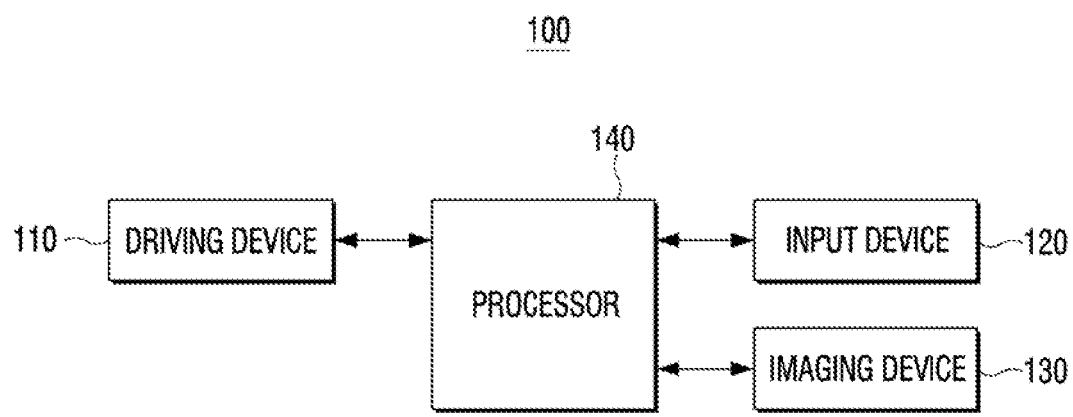
FIG. 2 is a block diagram illustrating a simple configuration of a cooking device according to an embodiment.

FIG. 2 is a block diagram illustrating a simple configuration of a cooking device according to an embodiment.

Referring to FIG. 2, the cooking device 100 may include a driving device 110, an input device 120, an imaging device 130, and a processor 140.

The driving device 110 is a device for performing cooking operations corresponding to a plurality of functions of the cooking device 100 described above. For example, the driving device 110 may perform an operation of applying high temperature heat, such as 100 degrees or more, to the food when the roasting function is input. When the fermentation function is input, the driving device 110 may perform the operation of applying heat of temperature around 40 degrees to the food for ten hours.

The driving device 110 may sequentially perform cooking operations corresponding to each of the plurality of control commands when a command for a cooking mode consisting of a plurality of control commands is inputted.

For example, when a command for a cooking mode A composed of control command 1 corresponding to "performing a roasting function for ten minutes at 180 degrees" and control command 2 corresponding to "performing a function of roasting for five minutes at 160 degrees" is inputted, the driving device 110 may perform a roasting function for ten minutes at 180 degrees which is a cooking operation corresponding to the control command 1, and then may perform a roasting function for five minutes at 160 degrees, which is a cooking operation corresponding to the control command 2.

The input device 120 may receive a function selection and a setting option for the selected function. The function may include roasting, drying, defrosting, fermentation, an air-frying and a steam function, or the like.

The input device 120 may receive one of a plurality of functions from a user and receive a setting option, such as a setting temperature or a setting time, for the function. For example, the input device 120 may receive a roasting function from a user and receive a setting option to perform the roasting function for ten minutes at 180 degrees.

The input device 120 may receive a command for cooking modes consisting of a plurality of control commands from a user. For example, a user may receive a command for cooking mode A consisting of control command 1 corresponding to function of "performing a roasting function for ten minutes at 180 degrees" and a control command 2 corresponding to a function of "performing a roasting function for five minutes at 160 degrees."

The input device 120 may receive a setting command for a photographing method of a food to be cooked by a user. The operation of setting the photographing method will be described below in connection with the operation of the processor 140.

The input device 120 may receive through a menu displayed on a display 170. The input device 120 may be implemented as a plurality of buttons, a keyboard, a mouse, or the like, and may be implemented as a touch screen capable of simultaneously performing the functions of the display 170.

An imaging device 130 may obtain a photographed image or a photographed video for a predetermined area. The imaging device 130 may be arranged on one side of a cooking chamber (not shown) inside the cooking device 100 to obtain a photographed image or a photographed video for a predetermined area in the cooking chamber.

The predetermined area is a detectable distance which the imaging device 130 may detect light and a spatial range according to the placement position of the imaging device 130, and may be a region where a change of the food to be cooked is changed through a cooking process may be clearly identified.

A position at which the imaging device 130 is arranged is not limited to the above example and may be any position that may photograph the food to be cooked.

The imaging device 130 may photograph a food to be cooked when the driving device 110 performs the cooking operation according to the input control command. When the cooking operation of the driving device 110 is completed, the imaging device 130 may complete the photographing operation.

The processor 140 may perform control for each configuration in the cooking device 100. Specifically, the processor 140 may control the driving device 110 to perform a cooking operation corresponding to the input control command when a control command for a specific function is input.

When performing the cooking operation by the driving device 110, the processor 140 may control the imaging device 130 to photograph the food to be cooked.

Ahead of performing photographing, the processor 140 may receive settings for the photographing method from the user through the input device 120. The processor 140 may receive settings for a photographing speed such as "fast, normal, and slow" from a user. The processor 140 may control the imaging device 130 to photograph the food to be cooked according to the setting for the inputted photographing method.

For example, when a user has received "slow" as a setting for a photographing speed from a user, the processor 140 may control the imaging device 130 to record the food to be cooked in low speed.

The processor 140 may edit the photographed image to generate an edited image. The processor 140 may analyze each of the plurality of frames to identify frames in which the change in comparison with the previous frame has occurred above or equal to a preset ratio, and may generate an edited image by using the identified frames.

A specific description of an operation to generate an edited image by identifying a frame in which a change in comparison with a previous frame is greater than or equal to a preset ratio will be described with reference to FIG. 4.

The processor 140 may generate an edited image by using a frame when the operation of the driving device 110 is changed according to each of the plurality of control commands among the plurality of frames if the cooking mode command consisting of a plurality of control commands is inputted.

For example, when a command for a cooking mode A composed of control command 1 corresponding to "performing a function of roasting for ten minutes at 180 degrees" and command 2 corresponding to "performing a function of roasting for five minutes at 160 degrees" is input, the processor 140 may generate an edited image by using a frame of a time when the driving device 110 operates according to the control command 1 and a frame when the driving device 110 stops an existing operation and performs a new operation according to the control command 2.

The processor 140 may identify the function input from the user, select some of the plurality of frames according to a predetermined reference corresponding to the input function, and generate an edited image by using the selected frame. A detailed description of the operation of selecting a frame according to a predetermined reference corresponding to the input function will be described with reference to FIG. 5.

When the processor 140 additionally receives a control command from a user during a cooking operation, the processor 140 may identify a frame corresponding to the time when an additional input of the plurality of frames is received, and may generate an edited image by using the identified frame.

For example, the driving device 110 may additionally receive from the user a control command to change the setting temperature to 160 degrees while performing the roasting function for five minutes at 180 degrees as the control command of "performing a roasting function for ten minutes at 180 degrees" is input. In this example, the processor 140 may identify a frame corresponding to five minutes, which is a time point of additionally receiving a control command among the entire ten-minute images, and may generate an edited image by using the identified frame.

The method of editing the photographed image is not limited to the above example.

The processor 140 may generate a cooking content using the edited image and the input control command.

The cooking content may refer to data including the edited image and information on a control command corresponding to a cooking process displayed in the edited image. The user may identify the cooking process through the edited image included in the cooking content and control the cooking device to perform the same cooking process using the control command included in the cooking content if performing the same cooking process as the identified cooking process is desired.

The processor 140 may generate a cooking content to include an image or a script corresponding to the control command input to the edited image. For example, if a control command corresponding to "performing a roasting function for ten minutes at 180 degrees" is input, the processor 140 may perform additional editing to generate a cooking content by including an image or a script corresponding to the "roasting function for ten minutes at 180 degrees" in the edited image.

The processor 140 may generate the cooking content by using the previously input control command and the additional input control command when the user additionally receives the control command from the user during the cooking operation.

The processor 140 may identify metadata related to the cooking operation, and may generate a cooking content by using the identified metadata. The metadata related to the cooking operation may include information such as performing time of the cooking operation, the internal temperature of the cooking device 100 detected through a temperature sensor (not shown) of the cooking device 100 and the door opening/closing of the cooking device 100 detected through door opening/closing detection sensor (not shown) of the cooking device 100, and is not limited to the above-described example.

The processor 140 may perform a cooking operation corresponding to the cooking content by using the generated cooking content. The processor 140 may generate the cooking content and store the same. When the control command is input to perform the cooking operation corresponding to the cooking content stored by the user, the processor 140 may extract a control command from the stored cooking content and control the driving device 110 to operate according to the extracted control command.

Referring to FIG. 2, there is only an imaging device. However, in the implementation, a cooking device may have a plurality of imaging devices and may generate an edited image by using a plurality of images photographed from a plurality of imaging devices.

Although a simple configuration of a cooking device is described, various configurations may be additionally provided in the implementation. This will be described below with reference to FIG. 3.

Figure 3:
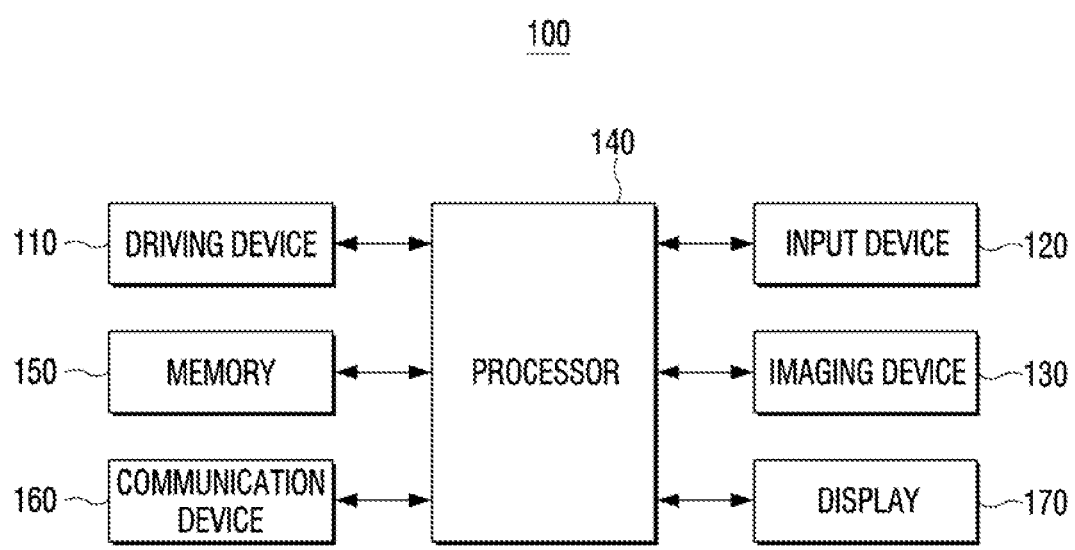
FIG. 3 is a block diagram illustrating a specific configuration of a cooking device according to an embodiment.

FIG. 3 is a block diagram illustrating a specific configuration of a cooking device according to an embodiment.

Referring to FIG. 3, the cooking device 100 according to an embodiment may include the driving device 110, the input device 120, the imaging device 130, the processor 140, a memory 150, a communication device 160, and a display 170.

The driving device 110, the input device 120, the imaging device 130, and the processor 140 perform the same function as FIG. 1 and will not be further described.

The memory 150 may store various data for overall operations of the cooking device 100, such as a program for processing or control of the processor 140. The memory 150 may store various application programs running on the cooking device 100, data and instructions for operation of the cooking device 100.

The memory 150 is accessed by the processor 140, and data reading/writing/correcting/deleting/updating by the processor 140 may be performed. The memory 150 may be implemented as a storage medium in the cooking device 100, as well as an external storage medium, a removable disk including a universal serial bus (USB), a web server through a network, or the like.

The memory 150 may store the cooking content. The memory 150 may store the cooking content generated by the cooking device 100, and when the cooking content is received from the communication device 160, the memory 150 may store the received cooking content.

The memory 150 may store information on a cooking mode command composed of a plurality of control commands. For example, the memory 150 may store information on a cooking mode A composed of control command 1 corresponding to "performing a roasting function for ten minutes at 180 degrees" and control command 2 corresponding to "performing a roasting function for five minutes at 160 degrees".

The communication device 160 may be connected to an external device (not shown) and may receive various data from an external device. The communication device 160 may perform communication through not only connection to an external device through a local area network (LAN) and an Internet network, but also connection through a universal serial bus (USB) port or wireless communication port (e.g., WiFi 802.11a/b/g/n, Near Field Communication(NFC), Bluetooth). The external device may include a personal computer (PC), a notebook computer, a smartphone, a server, a separate cooking device, or the like.

The communication device 160 may transmit and receive cooking content through communication with an external device. The communication device 160 may transmit the cooking content directly generated in the cooking device 100 to the external device and receive the cooking content from the external device.

The processor 140 may receive a specific cooking content from an external device through the communication device 160, and may control the driving device 110 to perform a corresponding cooking operation using the received cooking content. The specific description of the above-described operation will be described in detail with reference to FIGS. 6 to 8.

The display 170 may display various information provided by the cooking device 100. The display 170 may display the operating state of the cooking device 100, or display a user interface window for selecting the function selected by the user and the setting option selection.

For example, the display 170 may display that the cooking device 100 is performing a fermentation function, or may display the interface window so that the user may select to operate the fermentation function for how many hours.

The display 170 may reproduce an image photographed through the imaging device 130. The user may perform editing on images photographed through the input device 120. The user may identify some images to be edited among the entire photographed images played through the display 170, and select some images to be used as an edited image through the input device 120. The processor 140 may generate an edited image by using some selected images.

The display 170 may reproduce the edited image included in the cooking content received from the external device.

In the related art, an image photographing a food to be cooked may be generated. However, the photographed image does not include information on a control command for a cooking process, and the user has to remember a control command for the cooking process, making the user inconvenient. Even if the photographed image is shared outside, another user may not identify which control command needs to be input to the cooking device in order to perform the cooking process of the photographed image.

As described above, the cooking device according to an embodiment may photograph a food to be cooked and generate a cooking content including an input control command. The generated cooking content may be stored, and the same cooking operation may be performed without an additional control command input, thereby user convenience may be enhanced.

The generated cooking content may be shared with an external device and the cooking content may be used as data that is a basis for development of a recipe.

The cooking operation corresponding to the received cooking content may be easily performed by receiving the cooking content from the external device and thus, user convenience may be enhanced.

Figure 4:
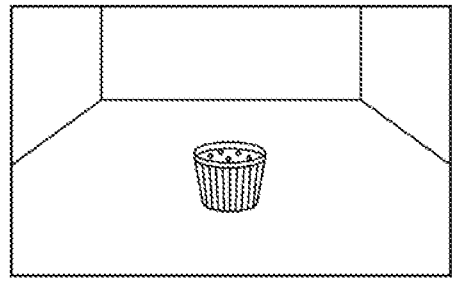
FIG. 4 is a diagram illustrating a method of generating an edited image according to an embodiment.
Figure 4:
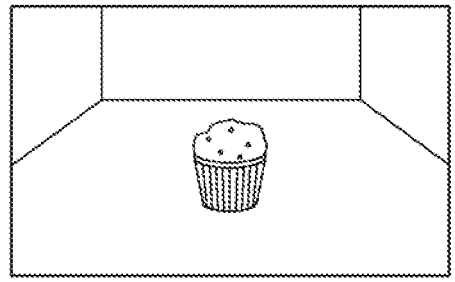

FIG. 4 is a diagram illustrating a method of generating an edited image according to an embodiment.

The processor 140 may analyze each of the plurality of frames to identify frames in which the change in the previous frame has occurred above a preset ratio, and generate an edited image by using the identified frames.

The preset ratio may indicate, as the cooking process progresses, the ratio which may be seen that a change in a food to be cooked is sufficiently generated with respect to the previous frame. The preset ratio may be arbitrarily determined and may be determined through repetitive experimentation.

When 1000 frames are included in a photographed image, the processor 140 may compare the $N^{th}$ frame and the $N-1^{th}$ frame to generate an edited image by using the Nth frame when the change of the $N^{th}$ frame compared to the $N-1^{th}$ frame has occurred above a predetermined ratio.

For example, referring to FIG. 4, some frames of an image in which a muffin dough in a foil is baked in the cooking device 100 may be identified. The frame of FIG. 4B corresponds to the $N^{th}$ frame, and the frame of FIG. 4A corresponds to the $N-1^{th}$ frame. The processor 140 may identify whether a change in the frame of FIG. 4B has occurred above a predetermined ratio compared to the frame of FIG. 4A. If one or more conditions are satisfied, the processor 140 may generate an edited image using the frame of FIG. 4B.

The processor 140 may analyze each of the plurality of frames to identify a region of interest in which the food to be cooked is located in the photographed image. By identifying a frame in which the region of interest is changed by a predetermined ratio or more through comparison with a previous frame, an edited image may be generated.

For example, the processor 140 may identify a region of interest in which the muffin in a foil is located foil from each frame of FIGS. 4A and 4B. The processor 140 may compare the region of interest in the frame of FIG. 4B with the region of interest in the frame of FIG. 4A to identify whether the region of interest in the frame of FIG. 4B has changed by more than a predetermined ratio. If a condition of a preset ratio or more is satisfied, the processor may generate an edited image using the frame of FIG. 4B.

When identifying a frame which is changed by a preset ratio or higher according to the above method, the processor 140 may generate an edited image by using the predetermined number of frames using the identified frame and the predetermined number of frames after the identified frames.

If the processor 40 identifies the $N^{th}$ frame as a frame that changes more than a predetermined ratio, the processor 140 may generate an edited image using the $N^{th}$ and M frames (N+1, N+2, . . . , and N+$M^{th}$ frame) after the $N^{th}$ frame.

The method of generating the edited image by analyzing each of a plurality of frames is not limited to the above example.

FIG. 5 is a diagram illustrating a method of generating an edited image of a cooking device by functions according to an embodiment.

Referring to FIG. 5, an editing method table displaying information about an editing method corresponding to a plurality of functions of the cooking device 100 is described.

According to each of the plurality of functions of the cooking device 100, the time point corresponding to the main cooking process of the cooking operation may be different. For example, when the fermentation function is performed for a total of 12 hours, the time point at which the fermentation process is actively performed may correspond to six hours which is the middle of the entire fermentation time. When the roasting function is performed for 15 minutes, the time at which the food becomes roasted may correspond to ten minutes, which is a ⅔ time point of the entire roasting time.

The processor 140 may edit the photographed image by using characteristics that the time points corresponding to the main cooking process are different according to each of the plurality of functions.

The processor 140 may identify what is a function selected by a user among a plurality of functions. The processor 140 may identify what is the editing method corresponding to the function identified by using the editing method table of FIG. 5. The processor 140 may edit the photographed image according to the identified editing method.

For example, if the function selected by the user is a "fermentation" function, the processor 140 may identify that the editing method corresponding to the fermentation function is an editing method A from the editing method table. The editing on an image photographed according to the editing method A may be performed.

Even for the same function, the time point corresponding to the main cooking process may be different according to the setting option selected by the user, and the editing method table may provide information on the editing method in consideration of the function selected by the user as well as the information about the setting option selected by the user.

The function selected by the user may be "roasting" function and "180 degrees" may be input as a setting temperature. The function selected by the user may be a "roasting" function and "150 degrees" ma be input as a setting temperature.

In the former case, since the roasting operation is performed at a significantly high temperature, the time at which the food being roasted is emphasized may come earlier. Therefore, considering both the selected function and the setting option information, the time point corresponding to the main cooking process may be more clearly identified.

The editing method table may provide different editing methods in consideration of the selected setting option, even for the same function of the roasting A, roasting B, and roasting C.

Each of the plurality of editing methods, such as editing method A to editing method F of FIG. 5 may be set to use an image for a particular time point, and may be set to use the method described above in FIG. 4, and is not limited to the above-described example.

In describing FIG. 5, the editing method table includes information on the function and the editing method. However, in implementation, information about a setting option corresponding to the selected function and specific information about the editing method may be further included, and the information which may be further included is not limited thereto.

In describing FIG. 5, the editing method is determined based on the selected function and the selected setting option. However, in implementation, the editing method may be determined based on other factors.

Figure 6:
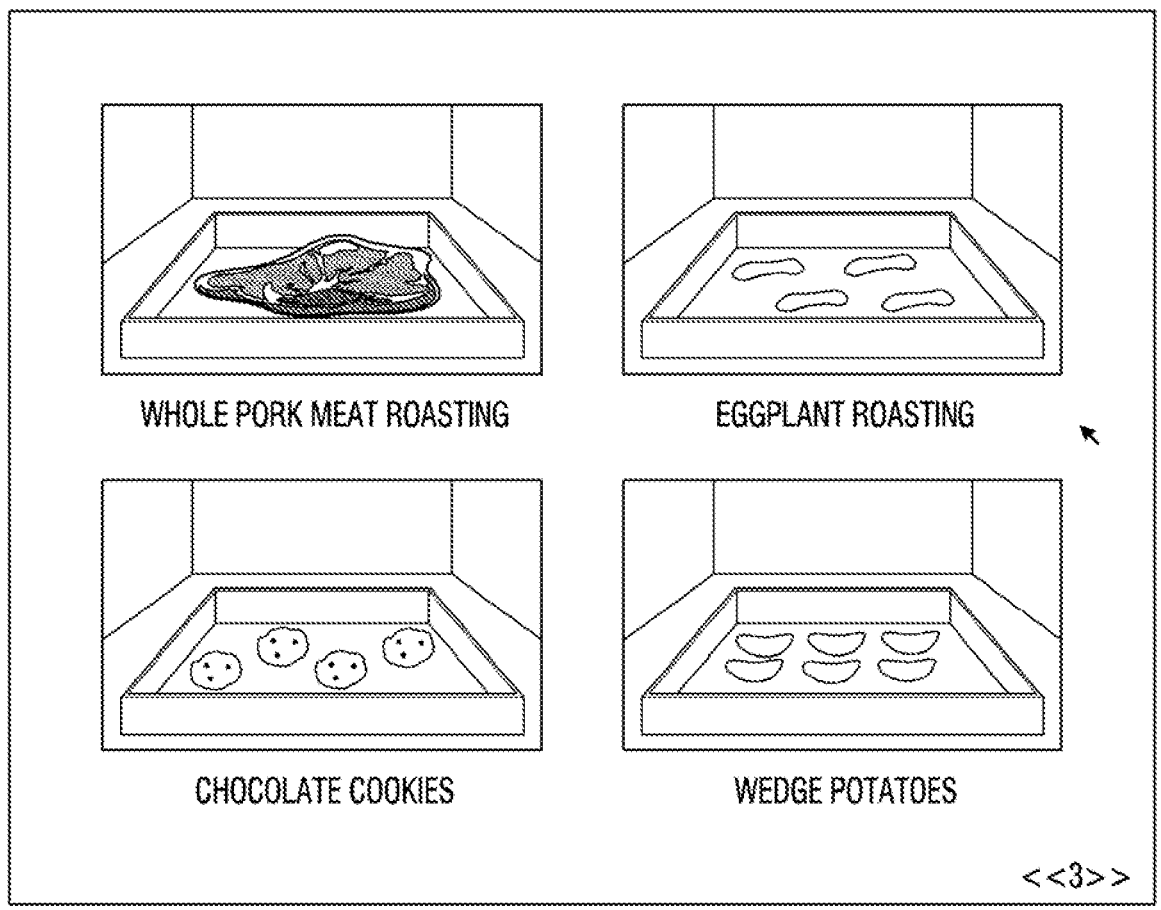
FIGS. 6 to 8 are diagrams illustrating a method of selecting cooking content of a user according to an embodiment.
Figure 7:
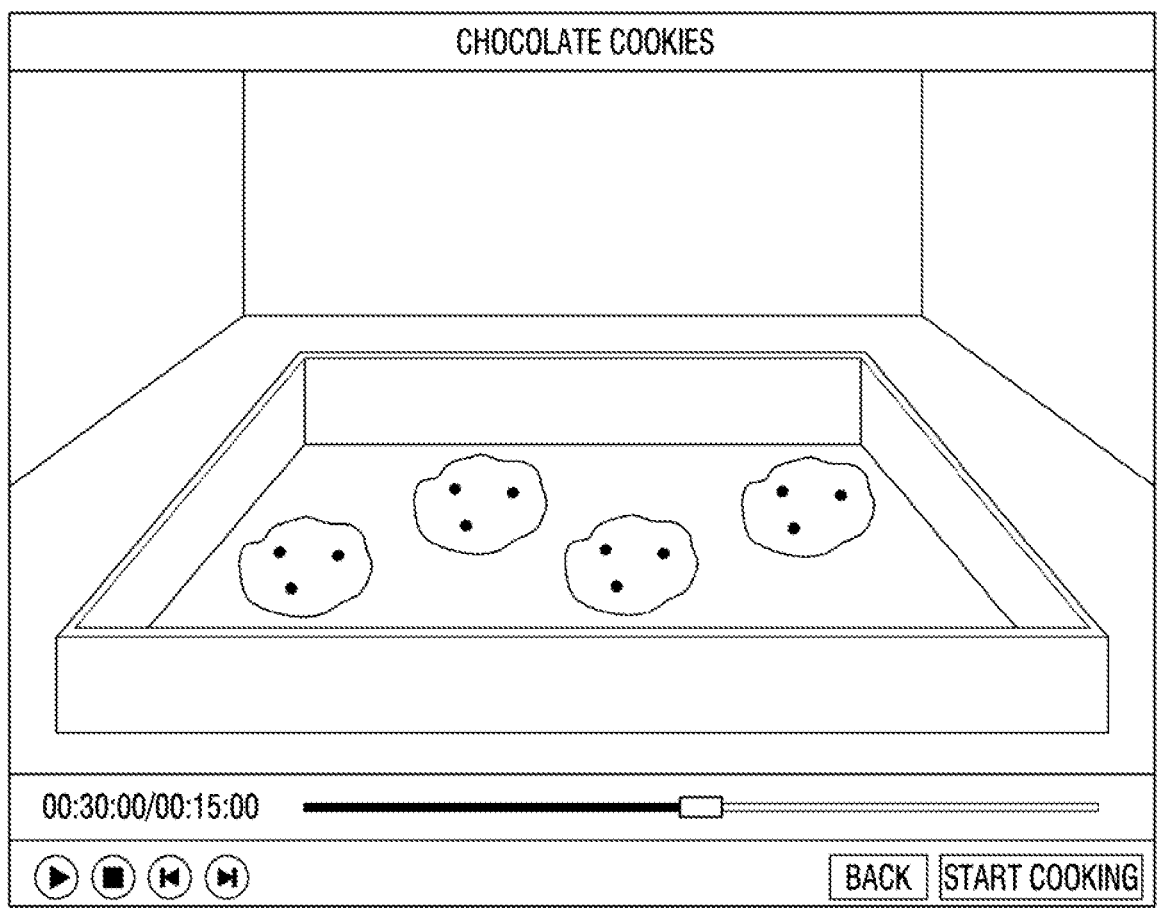
Figure 8:
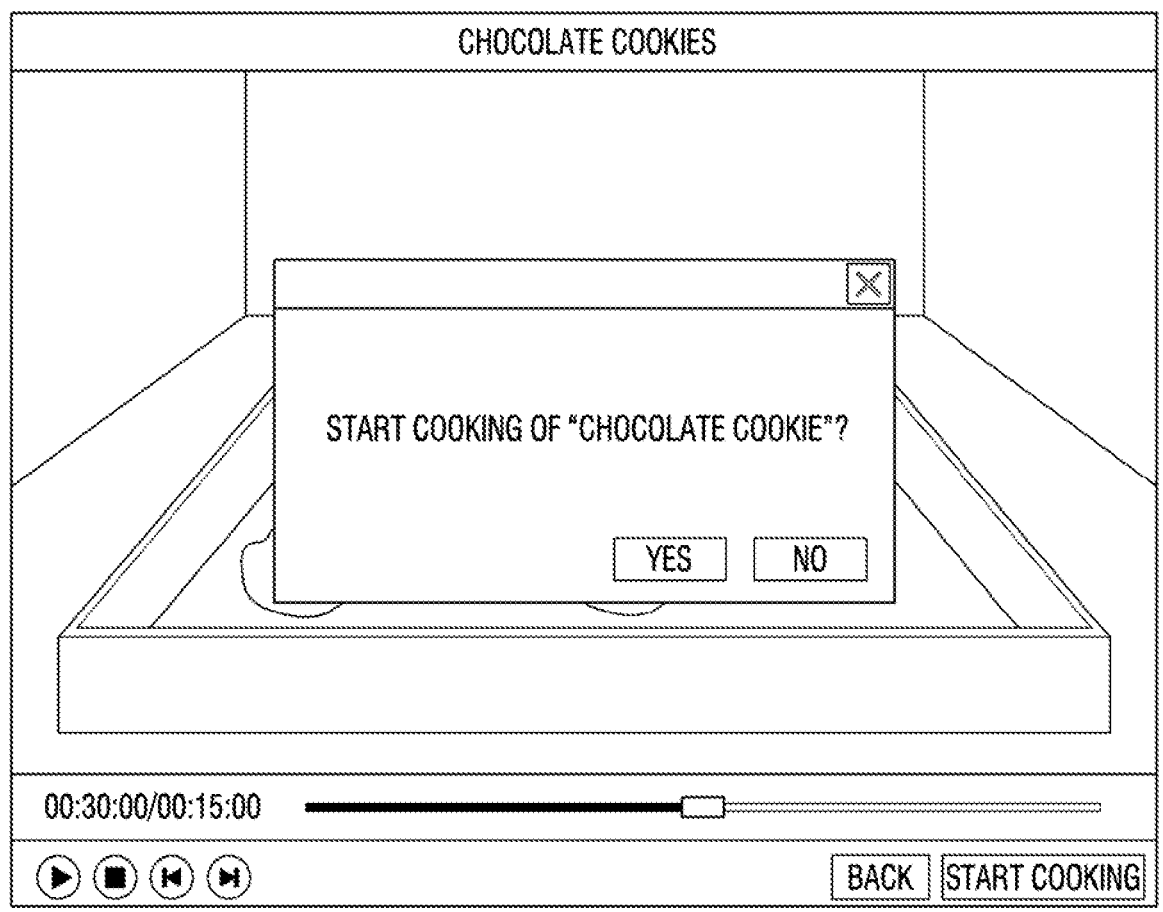

FIGS. 6 to 8 are diagrams illustrating a method of selecting cooking content of a user according to an embodiment.

The processor 140 may receive a cooking content from an external device through the communication device 160, extract a control command included in the received cooking content, and control the driving device 110 to perform a cooking operation corresponding to the cooking content received by using the extracted control command.

The processor 140 may provide some information for a plurality of cooking contents to the user before receiving the entire cooking content, and may receive a selection of one of the plurality of cooking contents, and receive the selected cooking content.

An operation in which a processor receives selection of one cooking content from a user by using a plurality of thumbnails corresponding to a plurality of cooking content will be described below.

FIG. 6 is a diagram illustrating a method of displaying a plurality of thumbnails corresponding to a plurality of cooking contents according to an embodiment.

The processor 140 may receive a plurality of thumbnails corresponding to each of the plurality of cooking content from the external device and display the thumbnail to the user through the display 170, and may receive selection of one thumbnail from the user.

For example, referring to FIG. 6, the processor 140 may receive four thumbnails corresponding to each of the four cooking content of whole pork meat roasting, eggplant roasting, chocolate cookies, and wedge potatoes, and may display the thumbnails to the user through the display 170. One thumbnail among the four thumbnails may be selected from the user.

The thumbnail may be selected according to various manners, as an image representative of an edited image. According to another example, a frame at the time point when the cooking operation is completed may be used as a thumbnail. As another example, by analyzing each of the plurality of frames, a fame of which a change compared to a previous frame is greater than or equal to a predetermined ratio may be used as a thumbnail. In another example, a frame to be used as a thumbnail may be directly selected from a user. The method of selecting the thumbnail image is not limited to the above-described example.

The processor 140 may receive the cooking content corresponding to the selected thumbnail from an external device.

FIG. 7 is a diagram illustrating a method of reproducing an edited image of cooking content according to an embodiment.

The processor 140 may extract the edited image from the received cooking content and may reproduce the extracted image through the display 170.

For example, referring to FIG. 7, when a user selects a thumbnail of the chocolate cookie among the four thumbnails, the processor 140 may receive the cooking content corresponding to the chocolate cookie from the external server. The processor 140 may extract the edited image from the received cooking content, and reproduce an edited image including the chocolate cookie cooking process through the display.

FIG. 8 is a diagram illustrating a method of identifying whether to perform a cooking operation according to an edited image according to an embodiment.

If reproduction of the edited image is completed or the cooking start command is received from the user while the edited image is reproduced, the processor 140 may receive identification from the user about whether to perform the cooking operation corresponding to the cooking content.

For example, referring to FIG. 8, while an edited image including the cooking process of the chocolate cookie is being reproduced, if a command "starting cooking" at a lower right end of the display 170 is received from the user, the processor 140 may identify whether the cooking operation corresponding to the chocolate cookie cooking content is performed.

When the command to execute the cooking operation is received from the user, the processor 140 may extract a control command from the received cooking content and control the driving device 110 to operate according to the extracted control command.

As such, the processor 140 may provide some information for a plurality of cooking content to the user, and receive one cooking content from the user, and perform a corresponding cooking operation by receiving the selected cooking content.

A method of displaying a plurality of thumbnails, a method for reproducing an edited image, and a method for selecting whether to progress the edited image are not limited to the method shown in FIGS. 6-8.

The method of receiving selection of one of the plurality of cooking content from the user is not limited to a method of using the thumbnail of each of the cooking content described above in FIGS. 6-8.

Figure 9:
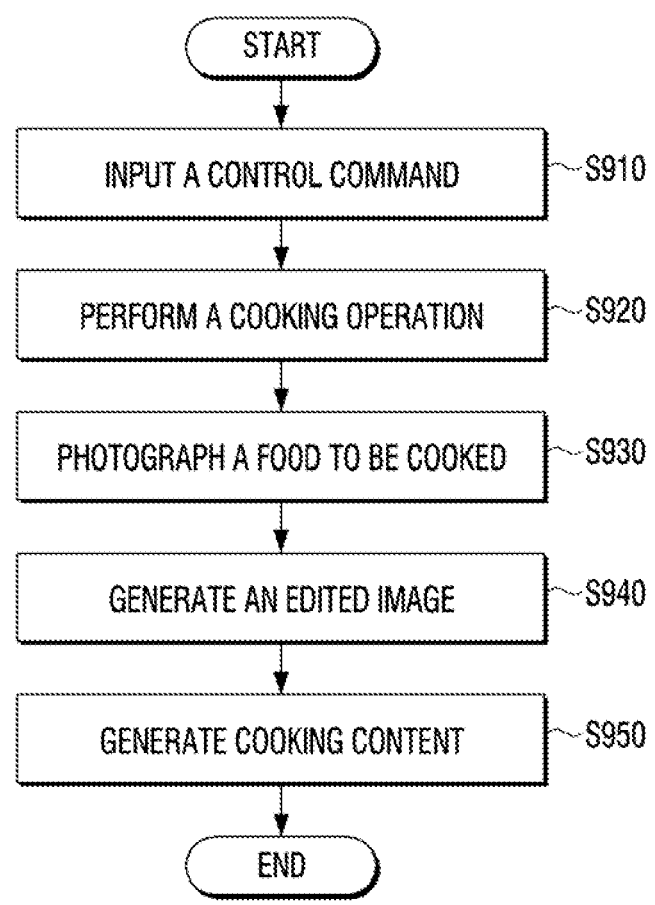
FIG. 9 is a flowchart illustrating a method of generating cooking content according to an embodiment.

FIG. 9 is a flowchart illustrating a method of generating cooking content according to an embodiment.

Referring to FIG. 9, a control command for cooking operation of a cooking device is received from a user in operation S910. One function among a plurality of functions of a cooking device may be selected, and a command for setting options such as temperature or cooking time for the function may be input.

A cooking operation corresponding to a control command input using the driving device may be performed in operation S920. In operation S930, food to be cooked is photographed. In addition, a setting for a photographing method may be input from a user, and a food to be cooked may be photographed according to the input setting.

The edited image may be generated by analyzing each of the plurality of frames of the photographed image in operation S940. For example, each of the plurality of frames of the photographed image may be analyzed to identify frames in which a change compared to a previous frame occurs by a preset ratio or more and may generate an edited image using the identified frames.

In another example, each of the plurality of frames may be analyzed to identify a region of interest in which the food to be cooked is located in the photographed image. By identifying a frame in which a region of interest changes by a preset ratio or more through comparison of each frame with a previous frame, an edited image may be generated.

According to another example, when a frame that changes more than a predetermined ratio according to the above-described method is identified, an edited image may be generated using an identified frame and a predetermined number of frames after the identified frame.

In another example, when a cooking mode command consisting of a plurality of control commands is inputted, an edited image may be generated by using a frame at a time point when the operation of the driving device is changed according to each of the plurality of control commands among the plurality of frames.

In another example, a function input from a user may be identified, some of the plurality of frames may be selected according to a predetermined reference corresponding to the input function, and an edited image may be generated by using the selected frame.

According to another example, when a control command is additionally inputted from a user during a cooking operation, a frame corresponding to the time of the additional input among the plurality of frames may be identified to generate an edited image by using the identified frame.

A cooking content may be generated by using the edited image and the input control command in operation S950. The cooking content may refer to data including information on a control command corresponding to the edited image and a cooking process displayed in the edited image.

The cooking content may be generated to include an image or script corresponding to the control command input to the edited image.

When a control command is additionally inputted from a user during a cooking operation, the cooking content may be generated by adding an additional input control command.

The metadata associated with performing a cooking operation may be identified and the cooking content may be generated using the identified metadata.

A plurality of thumbnails corresponding to each of the plurality of cooking content may be received from the external server. The plurality of thumbnails received from the user may be displayed to the user, and one thumbnail may be selected from the user.

The cooking content may be received from the external device. The cooking content corresponding to the selected thumbnail may be received from the user.

An edited image may be extracted and displayed from the received cooking content. Whether to process the displayed edited image may be identified from the user. When the reproduction of the edited image is completed or when the user receives the cooking start command from the user while the edited image is being played, the user may identify whether the cooking operation corresponding to the cooking content is performed.

A control command may be extracted from the received cooking content, and a cooking operation corresponding to the cooking content may be performed based on the extracted control command. When a user identifies whether to progress the displayed edited image, the cooking operation corresponding to the received cooking content may be performed.

The method for controlling the cooking device may photograph a food to be cooked and generate a cooking content including an inputted control command, thereby enabling the same cooking operation without inputting a separate control command after storing the generated cooking content, and increasing user convenience.

Since the generated cooking content may be shared with an external device, the cooking content may be utilized as the basis of the recipe development, and the cooking content may be received from the external device so that the cooking operation corresponding to the received cooking content may be easily performed, thereby increasing user convenience. The control method shown in FIG. 9 may be performed on a cooking device having the configuration of FIG. 2 or FIG. 3, and may be executed on a cooking device having other configurations.

The control method as described above may be implemented as at least one execution program for executing the control method as described above, and the execution program may be stored in a non-transitory readable medium.

The non-transitory computer-readable medium may refer, for example, to a medium that stores data, such as a register, a cache, a memory or etc., and is readable by an apparatus. For example, the aforementioned various applications, instructions, or programs may be stored in the non-transitory computer-readable medium such as, for example, a compact disc (CD), a digital versatile disc (DVD), a hard disc, a Blu-ray disc, a USB drive, a memory card, a read only memory (ROM), and the like.

Figure 10:
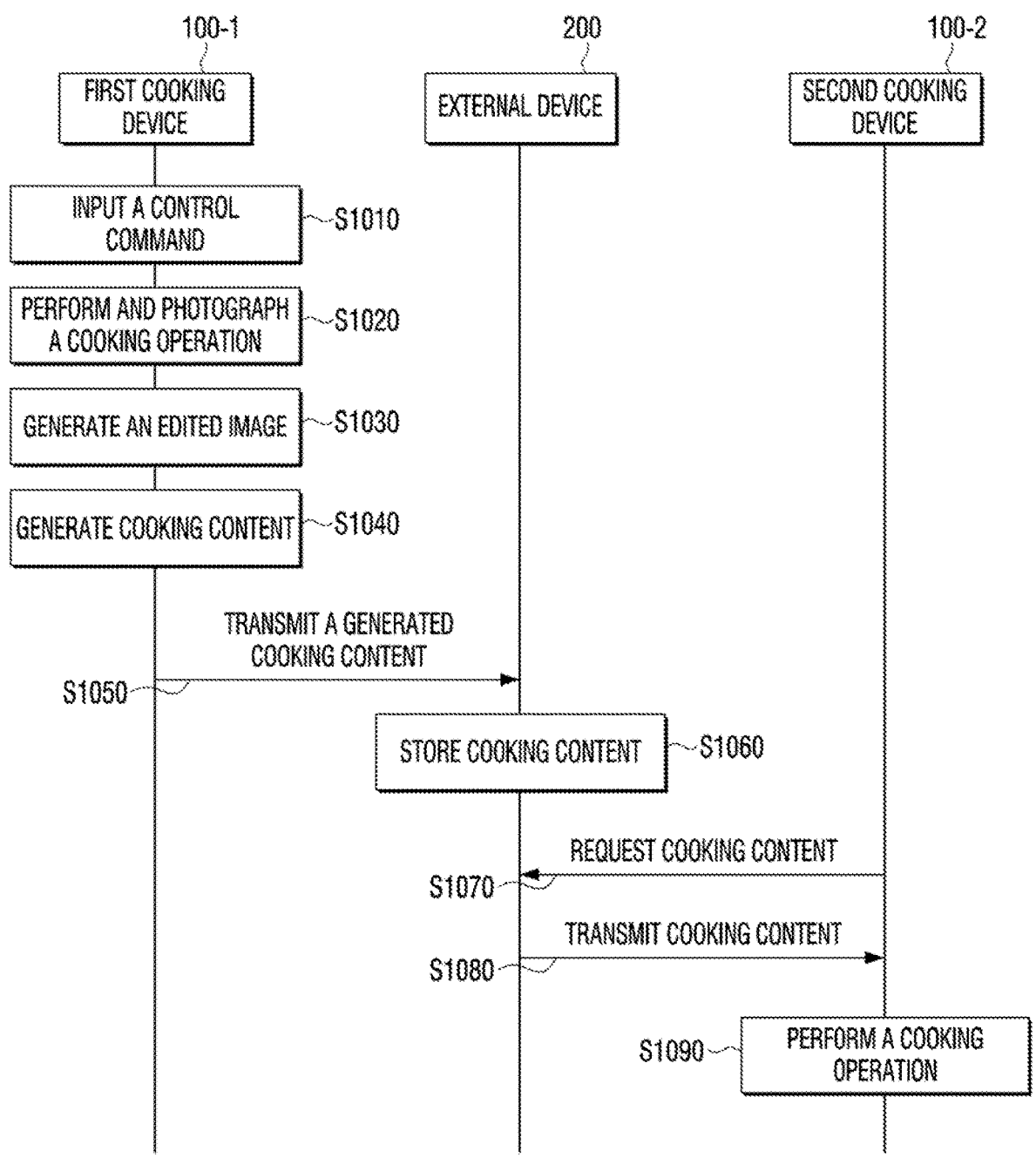
FIG. 10 is a sequence diagram illustrating a cooking content use system according to a first embodiment.

FIG. 10 is a sequence diagram illustrating a cooking content use system according to a first embodiment.

Referring to FIG. 10, a first cooking device 100-1 may receive a control command for a cooking operation from a user in operation S1010. The first cooking device 100-1 may control the driving device to perform the cooking operation according to the input control command, and may perform the cooking operation to photograph the food to be cooked by using the imaging device in operation S1020.

The first cooking device 100-1 may analyze each of the plurality of frames of the photographed image to generate an edited image in operation S1030. The first cooking device 100-1 may generate a cooking content by using an edited image and an input control command in operation S1040.

The operations S1010 to S1040 are duplicate with the description of FIG. 9 and a detailed operation method will be omitted.

The first cooking device 100-1 may transmit the generated cooking content to the external device 200 in operation S1050. The external device 200 may include a server, a smartphone, a personal computer (PC), or the like, and is not limited to the above example.

The external device 200 may store the received cooking content in operation S1060.

The second cooking device 100-2 may request a specific cooking content among a plurality of cooking content which the external device 200 stored in operation S1070. As described above in FIG. 9, when a thumbnail among one of the plurality of thumbnails is selected from a user, the specific cooking content may be a cooking content of the selected thumbnail.

The external device 200 may transmit the requested cooking content to the second cooking device 100-2 in operation S1080. The second cooking device 100-2 may perform cooking operations by using the received cooking content. The second cooking device 100-2 may extract a control command from the cooking content and perform a corresponding cooking operation.

The control method of the cooking device may share various cooking content by a plurality of cooking devices through an external device, and may have effects of developing a recipe and improving user convenience. The control method as shown in FIG. 10 may be performed on a cooking device having the configuration of FIG. 2 or FIG. 3, and may be executed on a cooking device having other configurations.

The control method as described above may also be implemented as at least one execution program for executing the control method as described above, and the execution program may be stored in a non-transitory readable medium.

Figure 11:
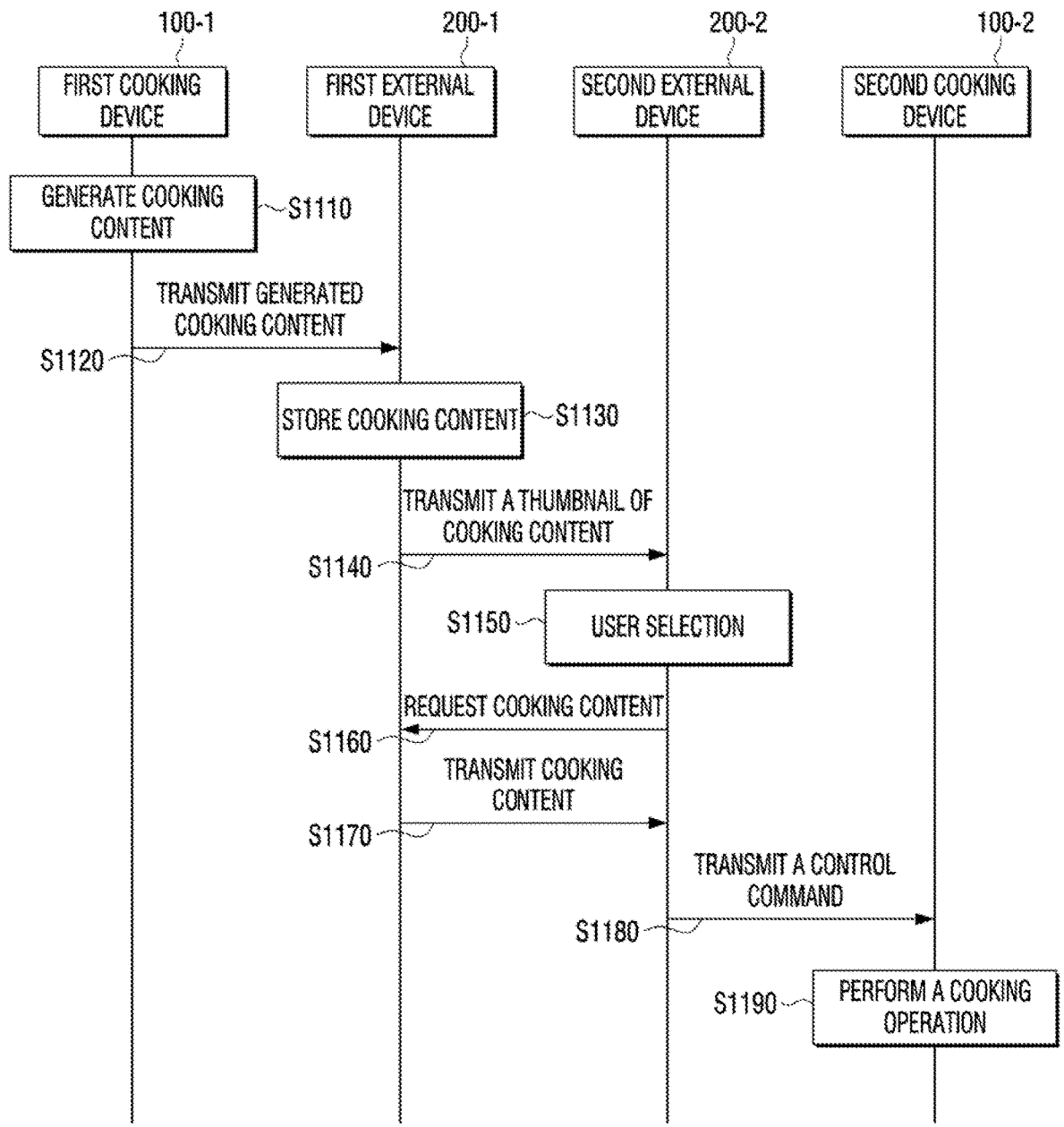
FIG. 11 is a sequence diagram illustrating a cooking content use system according to a second embodiment.

FIG. 11 is a sequence diagram illustrating a cooking content use system according to a second embodiment.

The first cooking device 100-1 may generate a cooking content according to the operations S1010 to S1040 described above in operation S1110. The first cooking device 100-1 may transmit the generated cooking content to the first external device 200-1 in operation S1120. The first external device 200-1 may correspond to a server and is not limited to the above example.

The first external device 200-1 may store the received cooking content in operation S1130. A plurality of thumbnails corresponding to a plurality of cooking content may be transmitted from the second external device 200-2 in operation S1140. The second external device 200-2 may be a smartphone, a PC, a notebook computer, or the like, and is not limited to the above example.

The second external device 200-2 may display the plurality of received thumbnails to the user and may receive selection of one thumbnail from the user in operation S1150. When one thumbnail is selected, the second external device 200-2 may request information on the cooking content for the selected thumbnail in operation S1160.

The first external device 200-1 may transmit the requested cooking content to the second external device 200-2 in operation S1170. The second external device 200-2 may extract the edited image from the received cooking content and display the same to the user. Whether to proceed the displayed edited image may be identified from the user.

If the progress of the displayed edited image is identified by the user, the second external device 200-2 may extract the control command from the cooking content and transmit the extracted control command to the second cooking device 100-2 in operation S1180. The second cooking device 100-2 may be a cooking device used by a user of the second external device 200-2.

The second cooking device 100-2 may perform a cooking operation based on the received control command in operation S1190.

The control method of the cooking device may select the cooking content by using the second external device without performing a selection of the cooking content through the second cooking device, and may have an effect of performing a cooking operation corresponding to the selected cooking content even if the second cooking device does not have a display displaying the edited image. The control method shown in FIG. 11 may be performed on a cooking device having the configuration of FIG. 2 or 3, and may be executed on a cooking device having other configurations.

The control method as described above may also be implemented as at least one execution program for executing the control method as described above, and the execution program may be stored in a non-transitory readable medium.

While various embodiments have been shown and described, the disclosure is not limited to the specific embodiments. It should be understood by those of ordinary skill in the art that various changes in form and details may be made therein without departing from the spirit and scope as defined by the following claims and their equivalents.

What is claimed is:

1. A cooking device comprising:
a driving device configured to cook food to be cooked;
an input device configured to receive, from a user, a control command for a cooking operation of the cooking device;
an imaging device configured to photograph the food to be cooked; and
a processor configured to control the driving device such that a cooking operation corresponding to the inputted control command is performed,
wherein the processor is further configured to:
control the imaging device such that the food to be cooked is photographed to thereby provide a photographed image,
identify a frame in which a change compared to a previous frame is greater than or equal to a predetermined ratio from among a plurality of frames of the photographed image,
generate an edited image based on the identified frame, and
generate cooking content by using the edited image and the inputted control command.

2. The cooking device of claim 1, wherein the processor is further configured to;
based on receiving, from the user, a cooking mode command composed of a plurality of control commands, generate the edited image using a frame of a time point at which the operation of the driving device changes according to each of the plurality of control commands.

3. The cooking device of claim 1, wherein the processor is further configured to:
identify a function corresponding to the inputted control command among a plurality of functions of the cooking device,
select some frames among a plurality of frames of the photographed image according to a predetermined criterion corresponding to the identified function, and
generate the edited image using the selected frames.

4. The cooking device of claim 1, wherein the processor is further configured to:
based on additionally receiving a control command from a user during the cooking operation, generate the edited image by adding a frame at a time point when the additional control command is input, and
generate the cooking content by adding the additional control command.

5. The cooking device of claim 1, wherein the processor is further configured to:
generate the cooking content so that the edited image includes at least one of an image and a script corresponding to the inputted control command.

6. The cooking device of claim 1, further comprising:
a communication device communicable with an external server,
wherein the processor is further configured to:
receive a cooking content from the external server,
extract a control command from the received cooking content, and
control the driving device to perform a cooking operation corresponding to the cooking content based on the extracted control command.

7. The cooking device of claim 6, further comprising:
a display,
wherein the processor is further configured to:
receive a plurality of thumbnails corresponding to each of a plurality of cooking content from the external server,
control the display to display the plurality of thumbnails,
receive one of the plurality of thumbnails selected from the user, and
receive cooking content corresponding to the selected thumbnail from the external server.

8. The cooking device of claim 7, wherein the processor is further configured to:
extract an edited image from the received cooking content,
control the display to display the extracted edited image, and
based on receiving identification from a user about whether to process the displayed edited image, control the driving device to perform a cooking operation corresponding to the received cooking content.

9. A cooking device comprising:
a driving device configured to cook food to be cooked;
an input device configured to receive, from a user, a control command for a cooking operation of the cooking device;
an imaging device configured to photograph the food to be cooked; and
a processor configured to control the driving device such that a cooking operation corresponding to the inputted control command is performed,
wherein the processor is further configured to:
control the imaging device such that the food to be cooked is photographed to thereby provide a photographed image,
identify a frame in which a change compared to a previous frame is greater than or equal to a predetermined ratio from among a plurality of frames of the photographed image, and
generate the edited image by using the identified frame and a predetermined number of frames after the identified frame, and
generate cooking content by using the edited image and the inputted control command.

10. A control method of a cooking device comprising:
receiving, from a user, a control command for a cooking operation of the cooking device;
performing a cooking operation corresponding to the input control command using a driving device;
photographing a food to be cooked, to thereby provide a photographed image;
identifying a frame in which a change compared to a previous frame is greater than or equal to a predetermined ratio from among a plurality of frames of the photographed image;
generating an edited image based on the identified frame; and
generating cooking content by using the edited image and the inputted control command.

11. The control method of claim 10, wherein the generating the edited image comprises:
generating the edited image by using the identified frame and a predetermined number of frames after the identified frame.

12. The control method of claim 10, wherein the generating the edited image comprises:
based on receiving, from the user, a cooking mode command composed of a plurality of control commands, generating the edited image using a frame of a time point at which the operation of the driving device changes according to each of the plurality of control commands.

13. The control method of claim 10, wherein the generating the edited image comprises:
identifying a function corresponding to the inputted control command among a plurality of functions of the cooking device,
selecting some frames among a plurality of frames of the photographed image according to a predetermined criterion corresponding to the identified function, and
generating the edited image using the selected frames.

* * * * *